N. J. BLATHERWICK.
Bridle-Bit Attachment.
No. 224,633.　　　　　Patented Feb. 17, 1880.
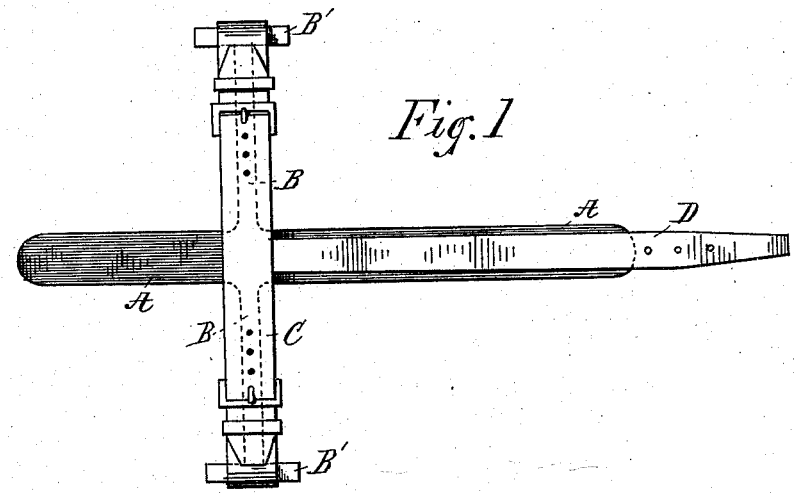
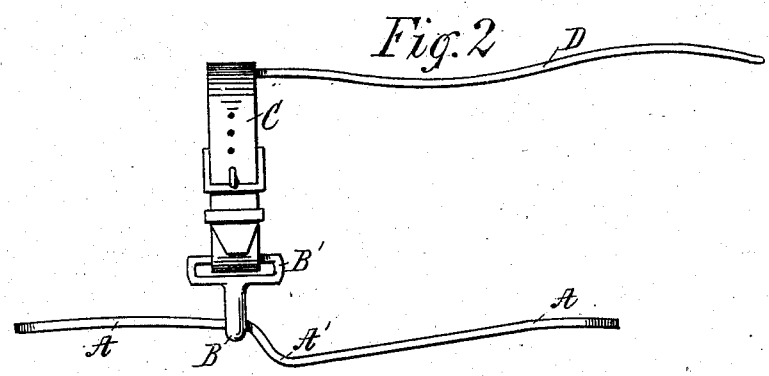

UNITED STATES PATENT OFFICE.

NELSON J. BLATHERWICK, OF CHICAGO, ILLINOIS, ASSIGNOR TO SAMUEL J. McINTOSH AND PARNELL MUNSON, OF SAME PLACE.

BRIDLE-BIT ATTACHMENT.

SPECIFICATION forming part of Letters Patent No. 224,633, dated February 17, 1880.

Application filed October 22, 1879.

*To all whom it may concern:*

Be it known that I, NELSON J. BLATHERWICK, of Chicago, in the county of Cook and State of Illinois, have invented a new and useful Attachment for Bridle-Bits, which is fully set forth in the following specification and accompanying drawings, in which—

Figure 1 is a top view, and Fig. 2 is a side view, of the device.

The object of my invention is to furnish a device to be used in connection with a common bridle-bit for the purpose of enabling the rider or driver of a horse to better hold and manage the animal, and it is intended more especially for horses which are hard in the mouth, and therefore difficult to hold or govern.

The invention consists in a piece of flat curved metal or other suitable material, about eight inches long, more or less, to which is secured a cross-piece of sufficient length to extend across the animal's mouth from side to side and project out on each side far enough to attach a strap by which to hold it in place, the cross-piece acting as a fulcrum on which the other part works as a lever, the shorter end of which is located near the animal's front teeth, the other projecting up into the mouth and extending upward some distance beyond the bridle-bit.

Like letters of reference indicate like parts in the several figures of the drawings.

A is the flat piece, which lies lengthwise of the animal's mouth. A' is the curve in the same, adapted for the bridle-bit to rest in. B is the cross-piece, which is firmly secured to the piece A just below the curve A'. B' B' are the ends of the cross-piece B, provided with slots or holes in which to secure a strap, C, which extends over the horse's nose, and is secured at both ends, B' B', of the cross-piece B. D is a strap secured to the strap C about midway from its ends, and, extending up, is secured by means of a buckle to the top of the bridle.

The attachment is applied when the bridle is on the animal by sliding the longer end of the part A up into his mouth, on top of his tongue, but under the bridle-bit, (the strap C passing over his nose) until the curved part A' comes directly under the bit, the strap D being then secured to the top of the bridle to retain the attachment in this position. When the rider or driver pulls on the bridle-reins the bit is drawn or slid up onto the upper part of the piece A above the curve A', which causes the opposite end on the other side of the cross-piece to rise up against the roof of the animal's mouth, and instead of pulling the lower jaw back toward the neck, as is done by the common bit, having a tendency to shut off the animal's wind, it has a contrary effect, causing him to elevate his nose and giving him his full, free breathing capacity, and at the same time giving the driver complete control over him.

The attachment is also a sure means of preventing the animal from taking the bit in his teeth and running away with the driver—a common occurrence.

The piece A should be curved in about the form in Fig. 2, and should have the ends and sides beveled or rounded off and the top surface polished, so as not to injure the animal's mouth. It can be made to operate more or less severely by tightening or loosening the strap C over the nose.

I have tried the attachment repeatedly and found it to work with perfect success in every instance in holding and controlling the most unruly and fractious animals, however hard in the mouth.

Having thus described my invention, what I claim, and desire to secure by Letters Patent, is—

A separate attachment consisting of the longitudinal curved part A, secured to the cross-piece B, provided with strap C, in combination with a bridle-bit, such attachment adapted to be secured in the horse's mouth with part A under the bit, but not rigidly attached thereto, substantially as and for the purpose specified.

NELSON J. BLATHERWICK.

Witnesses:
JNO. H. WHIPPLE,
SAML. I. McINTOSH.